US011730179B2

(12) United States Patent
Bassi

(10) Patent No.: US 11,730,179 B2
(45) Date of Patent: Aug. 22, 2023

(54) GLUTEN-FREE STARCH AND METHODS OF PRODUCING THE SAME

(71) Applicant: Manildra Milling Corporation, Leawood, KS (US)

(72) Inventor: Neal Dev Bassi, Overland Park, KS (US)

(73) Assignee: Manildra Milling Corporation, Leawood, KS (US)

(*) Notice: Subject to any disclaimer, the term of this patent is extended or adjusted under 35 U.S.C. 154(b) by 0 days.

(21) Appl. No.: 15/193,622

(22) Filed: Jun. 27, 2016

(65) Prior Publication Data

US 2016/0374374 A1    Dec. 29, 2016

Related U.S. Application Data

(60) Provisional application No. 62/184,316, filed on Jun. 25, 2015.

(51) Int. Cl.
| C08B 31/00 | (2006.01) |
| A23L 5/20 | (2016.01) |
| A23L 29/212 | (2016.01) |
| C08B 30/04 | (2006.01) |

(52) U.S. Cl.
CPC ............ *A23L 5/25* (2016.08); *A23L 5/20* (2016.08); *A23L 5/27* (2016.08); *A23L 29/212* (2016.08); *C08B 30/04* (2013.01); *C08B 31/00* (2013.01); *C12Y 304/21062* (2013.01); *A23V 2002/00* (2013.01)

(58) Field of Classification Search
CPC .......... C07H 1/06; C08B 30/04; C08B 31/00; A23L 5/25
USPC ...................................................... 536/127
See application file for complete search history.

(56) References Cited

U.S. PATENT DOCUMENTS

| 1,013,497 | A | 1/1912 | Klopfer |
| 2,504,962 | A | 4/1950 | Burdick |
| 2,530,823 | A | 11/1950 | Kilander et al. |
| 2,537,811 | A | 1/1951 | Boeckeler |
| 2,572,225 | A | 10/1951 | Walsh et al. |
| 2,821,501 | A | 1/1958 | Simpson et al. |
| 3,868,355 | A | 2/1975 | Rodgers |
| 3,951,938 | A | 4/1976 | Kerkkonen et al. |
| 4,132,566 | A | 1/1979 | Verberne et al. |
| 4,494,530 | A | 1/1985 | Jansma et al. |
| 8,123,865 | B2 | 2/2012 | Kirkpatrick et al. |
| 8,221,814 | B2 | 7/2012 | Peighambardoust et al. |
| 2002/0022252 | A1 | 2/2002 | Johnston et al. |
| 2003/0092149 | A1 | 5/2003 | Olsen et al. |
| 2004/0192896 | A1 | 9/2004 | Finch |
| 2005/0008761 | A1 | 1/2005 | Paulus et al. |
| 2008/0251067 | A1* | 10/2008 | Kirkpatrick ............ C08B 30/02 127/66 |
| 2009/0068309 | A1 | 3/2009 | Klisch |
| 2009/0092716 | A1* | 4/2009 | Atwell et al. .......... A21D 13/00 426/233 |
| 2012/0027890 | A1 | 2/2012 | Cerne et al. |
| 2012/0034339 | A1 | 2/2012 | Giuliani et al. |
| 2014/0065262 | A1 | 3/2014 | Giuliani et al. |

FOREIGN PATENT DOCUMENTS

| AU | 2016283411 A1 | 12/2016 |
| AU | 2019204224 A1 | 7/2019 |
| CN | 104642714 A | 5/2015 |
| EP | 0010447 A1 | 4/1980 |
| EP | 0730829 A2 | 9/1996 |
| EP | 1217901 | 7/2002 |
| EP | 1604998 A2 | 12/2005 |
| GB | 182829 A | 7/1922 |
| GB | 886644 A | 1/1962 |
| GB | 2506695 A | 4/2014 |
| JP | 2005034046 A * | 2/2005 |
| JP | 2005034046 A | 2/2005 |
| JP | 2015-532327 A | 11/2015 |
| WO | 02/02644 A1 | 1/2002 |
| WO | 2009/009146 A1 | 1/2009 |
| WO | 2010/006778 A1 | 1/2010 |
| WO | 2014/027139 A1 | 2/2014 |
| WO | 2014/158267 A1 | 10/2014 |
| WO | 2015/173148 A1 | 11/2015 |
| WO | 2016/210408 A1 | 12/2016 |

OTHER PUBLICATIONS

JP 2005034046 A , English Language Machine Translated Copy, 2005 (Year: 2005).*
Theresa Walter et al., "Production of gluten-free wheat starch by peptidase treatment," Journal of Cereal Science, vol. 60, No. 1, Apr. 5, 2014, pp. 202-209, XP055303289, GB.
International Search Report dated Sep. 27, 2016 in corresponding International Patent Application No. PCT/US2016/039541.
Examination Report dated May 14, 2019 in corresponding European Patent Application No. 16738308.2.
Imran et al. "Comparative efficiency of different methods of gluten extraction in indigenous varieties of wheat" Arch Latinoam Nutr. Jun. 2013; 63(2):180-187.

(Continued)

*Primary Examiner* — Leigh C Maier
*Assistant Examiner* — Everett White
(74) *Attorney, Agent, or Firm* — Troutman Pepper Hamilton Sanders LLP

(57) ABSTRACT

A method of processing an initial starch containing gluten protein to produce a purified starch having less than 20 parts per million of a gluten protein (i.e., "gluten free"). A slurry of the unpurified starch is treated with an agent to degrade the gluten protein, and then the degraded gluten protein is removed, resulting in a slurry of the purified starch. The slurry of the purified starch is dried, resulting in the purified starch, and the purified starch is tested to confirm that the purified starch meets the standard for being gluten free. The starch is from a member of the tribe Triticeae (e.g., wheat, rye, barley, or triticale) or other plant starch that either naturally contains gluten protein or may be contaminated with gluten protein. The agent is selected from among acids, bases, alcohols, surfactants, proteases, chaotropic agents, reducing agents, and combinations thereof.

15 Claims, 1 Drawing Sheet

(56) References Cited

OTHER PUBLICATIONS

Opponent's Outline of Submissions Filed in Corresponding AU Application No. 2019204224 by MGP Ingredients on May 1, 20228.
Evidence in Support of Opposition in Corresponding AU Application 2019204224 by MGP Ingredients, Inc., Declaration of Professor Melissa Anne Fitzgerald dated Aug. 26, 2021, Brisbane, Australia.
Statement of Grounds and Particulars in the Matter of Patent Acceptance AU2019204224 and In the Matter of Opposition Thereto by MGP Ingredients, Inc., dated May 26, 2021.
Applicant's Submissions in Answer in the Matter of Patent Acceptance AU2019204224 and In the Matter of Opposition Thereto by MGP Ingredients, Inc., dated May 25, 2022.
Maningat and Bassi, U.S. Appl. No. 62/184,316, filed Jun. 25, 2015.
Li et al., "The potential of papain and alcalase enzymes and process optimizations to reduce allergenic gliadins in wheat flour",Food Chemistry, 196, 1338-1345, published Apr. 1, 2016.
Novozyme brochure entitled "Proteases for biocatalysis", published Jun. 2016.
Hong et al., "Molecular Weight Distribution of Protein Hydrolysate by the Enzymatic Hydrolysis of Weakly Acid-Treated Wheat Gluten", Food Sci. Technol. Res., 7(2), 126-130, published May 2001.
Apar and Ozbek, "Corn Gluten Hydrolysis by Alcalase: Kinetics of Hydrolysis", Chemical Engineering Communications, 197(7), 963-973, published Jul. 2010.
Maningot and Seib, "Understanding the physicochemical and functional properties of wheat starch in various foods", Cereal Chemistry, 87(4), 305-314 (2010).
Halbmayr-Jech et al., "4.3 Detection of Gluten Utilizing next Generation Monoclonal Antibody G12", In Proceedings of the 26th Meeting Working Group on Prolamin Analysis and Toxicity, pp. 31-37. Published Sep. 2012 Retrieved from <http://www.Iforce.kuleuven.be>.
Response to Examination Report for Australian Patent Application No. 2019204224 (Exhibit P1A), dated Nov. 9, 2020.
Notice of Rejection dated Jun. 23, 2020 in corresponding Japanese Patent Application No. 2018-519269 and English translation.
Written Opinion dated Sep. 27, 2016 in corresponding International Patent Application No. PCT/US2016/039541.
Walter et al., "Degradation of gluten in wheat bran and bread drink by means of a proline-specific peptidase," Journal of Nutrition and Food Sciences 04(05) 1000293 (2014) <https://doi.org/10.4172/2155-9600.1000293>.
Office Action for European Application No. 16738308.2 dated May 2, 2023.

* cited by examiner

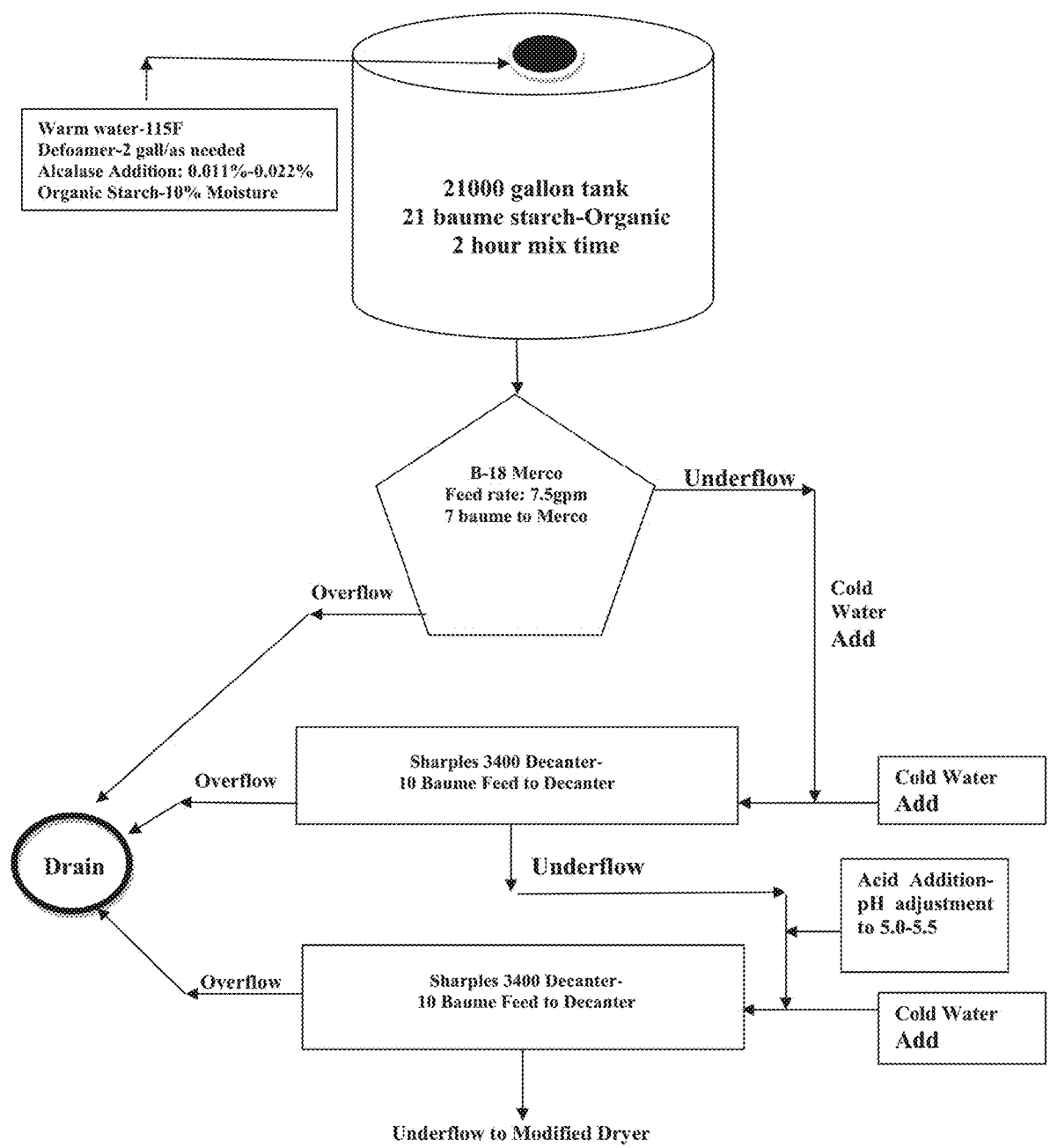

GLUTEN-FREE STARCH AND METHODS OF PRODUCING THE SAME

CROSS REFERENCE TO RELATED APPLICATIONS

This application claims priority to U.S. Provisional Patent Application Ser. No. 62/184,316, filed Jun. 25, 2015, the entire contents of which is hereby incorporated by reference herein.

TECHNOLOGY FIELD

This disclosure is broadly concerned with gluten-free starch and methods of producing such starch. More particularly, the present invention is concerned with starch containing less than 20 parts per million of gluten, and methods of removing gluten from starch and testing for gluten content to confirm such gluten-free starch. In some embodiments, the starch is derived from a source naturally containing gluten; in others, the starch is derived from a source which is naturally gluten-free but potentially contaminated or commingled with a gluten source.

BACKGROUND

Awareness of intolerance to gluten has increased in recent years. International and American standards for "gluten-free" labeling have been promulgated, in recognition of the need for products that meet those standards.

The Codex Alimentarius Commission (the "Codex") was developed by the Food and Agricultural Organization of the United Nations (FAO) and the World Health Organization (WHO) to develop harmonized international food standards, which protect consumer health and promote fair practices in food trade. The Codex defines "gluten" as a protein fraction of wheat, rye, barley, or oats or their crossbred varieties and derivatives thereof, to which some persons are intolerant and that is insoluble in water and 0.5 M NaCl. "Gluten-free" food is defined as dietary food consisting of or made from one or more ingredients which do not contain wheat (i.e., all *Triticum* species, such as durum wheat, kamut, spelt), rye, barley, oats, or their crossbred varieties, and which contain less than 20 mg/kg (or 20 parts per million (ppm) or 0.0020%) in total of gluten, based on the food as sold or distributed to the consumer, and/or consisting of one or more ingredients from wheat (i.e., all *Triticum* species), rye, barley, oats or their crossbred varieties, which have been specially processed to remove gluten, and the gluten level is less than 20 mg/kg in total, based on the food as sold or distributed to the consumer.

The U.S. Food and Drug Administration (FDA) similarly defines "gluten free" to mean less than 20 parts per million (ppm) of gluten. The FDA also allows manufacturers to label a food as "gluten-free" if it inherently does not contain gluten and if the food does not contain an ingredient that is any type of wheat, rye, barley, or crossbreeds of these grains, or an ingredient derived from these grains that has been processed to remove gluten, if it results in the food containing less than 20 ppm of gluten.

The popularity of gluten-free foods is increasing because of a health halo effect and because of millions of people afflicted with celiac disease, a hereditary, chronic inflammatory disorder of the small intestine triggered by the ingestion of gluten occurring in wheat, rye, barley, and crossbreeds of these grains. Celiac disease results in inflammation, villous atrophy, cryptic hyperplasia, poor absorption of nutrients and, if left untreated, increases the risk of other disorders such as anemia, osteoporosis, short stature, infertility, neurological problems, cancer, and other autoimmune disorders. A lifelong adherence to a gluten-free diet is considered the safest and most effective way to treat and manage the disease. People suffering from gluten intolerance or gluten sensitivity (i.e., those afflicted with Crohn's disease, ulcerative colitis, irritable bowel syndrome, or dermatitis herpetiformis) are also prescribed a gluten-free diet. In addition, some people experience an allergy or IgE-mediated response to gluten.

Wheat starch and wheat gluten are important ingredients in the food industry. Bakery products remain the predominant application for wheat starch because its properties closely match those of endogenous starch in wheat flour. The multi-functionality of wheat starch in yeast-leavened bread is summarized as follows: it dilutes the wheat gluten to an appropriate consistency, provides maltose for fermentation through the action of amylase, provides a surface for strong bonding with wheat gluten, provides flexibility for loaf expansion during partial gelatinization while baking, sets the loaf structure by providing a rigid network to prevent the loaf collapsing when cooling, gives structural and textural properties to the baked product, holds or retains water by acting as a temperature-triggered water sink, and contributes to staling. Fractionation and reconstitution studies revealed that rye and barley starches can substitute for wheat starch in producing bread of satisfactory volume. Starches from corn, sorghum, oat, rice, and potato produced inferior bread. Most gluten-free foods, however, are not formulated with wheat starch because of the perceived presence of gluten. People who are intolerant to gluten typically avoid anything with "wheat" in its name. Thus, there is a need to commercially develop gluten-free wheat starch for safe and widespread use in the production of gluten-free foods.

Several methods of producing wheat starch are employed in the industry, with the High-Pressure Disintegration (or Westfalia Three-Phase or Tricanter), Hydrocyclone, Alfa-Laval/Raisio and Modified Martin processes being the most popular. U.S. Pat. No. 3,951,938 (Kerkkonen et al. 1976) describes a method of separating gluten and starch from wheat flour, wherein a gluten yield is 15.1% with a protein content of 82.2% (dry basis) and a first grade starch yield is 56.7% with a protein content of 0.7% (dry basis). U.S. Pat. No. 2,821,501 (Simpson 1958) describes a method of producing a prime wheat starch with a protein content ranging from 0.04-0.85%. U.S. Pat. No. 3,868,355 (Rodgers 1975) describes a foam separation of starch and gluten, wherein a wheat starch concentrate exhibits 0.18% nitrogen or 1.03% protein. PCT Patent Application WO 2014/027139 (Sontag-Strohm et al. 2014) describes a process for the oxidative treatment of starch to degrade residual gluten proteins into peptides, but teaches leaving the resulting peptides in the starch to act as flavor-enhancers and/or bioactive agents. Other patents and patent applications that describe technologies for separating wheat starch and wheat gluten include EP 1217901 A2 (Olsen 2002), US 2004/0192896 A1 (Finch 2004), U.S. Pat. No. 4,494,530 (Jansma et al 1985), U.S. Pat. No. 1,013,497 (Klopper 1912), U.S. Pat. No. 2,537,811 (Boeckeler 1951), U.S. Pat. No. 2,530,823 (Kilander and Edsall 1950), U.S. Pat. No. 4,132,566 (Verberne et al. 1979), U.S. Pat. No. 2,572,225 (Walsh et al. 1951) and EP 0010447 A1 (Barr and Zwitserloot 1980). None of the above-identified patents and patent applications presents data on the purity of the wheat starch in terms of residual protein content or gluten level. Similarly, Atwell et al. (2009) described examples of technologies for removing gluten from gluten-containing ingredients, but did not actually produce a starch product with a known residual protein content and with a known gluten level as determined by ELISA tests.

While a majority of the production processes and technologies for wheat starch and wheat gluten do not report the protein content of the final wheat starch product, those that do report a range of 0.04-1.03% protein without assurance of having less than 20 ppm of gluten to meet the gluten-free labeling standard.

SUMMARY

The present invention overcomes the problems outlined above and provides a method of quantitatively solubilizing gluten proteins from a starch from a plant belonging to the tribe Triticeae (e.g., wheat, rye, barley, triticale) and extracting the dissolved proteins to produce a gluten-free (i.e., less than 20 ppm of gluten) starch that is independently confirmed.

An embodiment of the present invention is directed to a method of producing such gluten-free starch. A slurry of the starch is first obtained and then treated with an agent to degrade the gluten protein. This treating step may occur at elevated temperature conditions, particularly above room or ambient temperature and below the boiling point of the slurry. The degraded gluten protein is at least partially removed resulting in a slurry of the purified starch. The purified starch slurry is then dried resulting in the formation of a purified starch, resulting in the purified starch. Optionally, the purified starch can be tested in accordance with any number of test protocols to confirm that the purified starch contains less than 20 ppm of the gluten protein. Another embodiment of the present invention is directed to a purified starch produced using this method.

Some embodiments provide a method of processing an initial starch containing a gluten protein to produce a purified starch having less than 20 parts per million of the gluten protein, the method comprising the steps of obtaining a slurry of the initial starch; treating the slurry of the starch with an agent to dissolve or degrade the gluten protein; removing the dissolved or degraded gluten protein, resulting in a slurry of the purified starch; and drying the slurry of the purified starch, resulting in the purified starch.

In some embodiments, the initial starch is derived from a source naturally containing gluten or from a source contaminated with gluten protein. In some instances, the initial starch is selected from the group consisting of wheat starch, rye starch, barley starch, and triticale starch. In some instances the initial starch is selected from contaminated sources, such as oats, corn or other sources often treated in plants that process wheat. In some instances, the starch is wheat starch, corn starch, oat starch, rice starch, tapioca starch, mung bean starch, potato starch, or high amylose starch. In some instances, the initial starch has about 600 ppm gluten protein or less; about 470 ppm gluten protein or less; or about 36 ppm gluten protein or less.

In some embodiments, the treating step occurs at a temperature of from about 80° F. to about 120° F.

In some embodiments, the slurry of the starch has a specific gravity of from about 18° to about 25° Baumé.

In some embodiments, the step of treating the slurry of starch includes adding the agent and agitating the slurry of the starch for a period of time of from about 10 minutes to about two hours.

In some embodiments, the agent is selected from the group consisting of acids, bases, alcohols, surfactants, proteases, chaotropic agents, reducing agents, and combinations thereof.

In some embodiments, the agent comprises an acid selected from the group consisting of mineral acids, organic acids and salts thereof, and combinations thereof. In some embodiments, the agent is hydrochloric acid.

In some embodiments, the agent comprises a base selected from the group consisting of sodium hydroxides, potassium hydroxides, calcium hydroxides, ammonium hydroxides, and magnesium hydroxides, and alkaline salts, and combinations thereof. In some embodiments, the base is sodium hydroxide.

In some embodiments, the agent comprises sodium hydroxide and the treatment step comprises mixing sodium hydroxide with the starch slurry; and adjusting the pH to about 5.5 to about 6.5.

In some embodiments, the agent comprises an alcohol selected from the group consisting of $C_2$-$C_{10}$ alcohols and combinations thereof.

In some embodiments, the agent comprises a surfactant selected from the group consisting of anionic surfactants, cationic surfactants, nonionic surfactants, and zwitterionic surfactants, and combinations thereof.

In some embodiments, the agent comprises a protease selected from the group consisting of endo-proteases, exo-proteases, and combinations thereof. In some embodiments, the agent comprises alcalase. In some instances, the starch containing the gluten protein comprises 470 ppm gluten protein or less.

In some embodiments, the agent comprises the protease alcalase, and the treatment step comprises mixing alcalase with the starch slurry at a pH of about 5.5 to about 6.5.

In some embodiments, the step of removing the dissolved or degraded gluten proteins includes washing the treated slurry with water and centrifuging the washed slurry.

In some embodiments, the step of removing the dissolved or degraded gluten proteins includes washing the treated slurry with water and filtering the washed slurry.

In some embodiments, the step of drying includes drying the slurry of the purified starch in a flash drier, a spray drier, or a rotating drum drier.

Some embodiments further include the step of testing the purified starch to confirm that the purified starch contains less than 20 parts per million of the gluten protein. In some embodiments, the step of testing the purified starch includes using a test selected from the group consisting of R5 sandwich ELISA, R5 competitive ELISA, and G12 Romer ELISA.

Some embodiments further include the step of adjusting a pH of the slurry of the purified starch to a level of from about 5.0 to about 6.5.

Some embodiments of provide a purified starch having been processed to have less than 20 parts per million of a gluten protein by the method of any of the methods described herein.

BRIEF DESCRIPTION OF THE DRAWINGS

The sole FIGURE is a flowchart depicting an exemplary plant trial of one embodiment of the processes described herein.

DETAILED DESCRIPTION OF EMBODIMENTS

Commercial wheat gluten is popularly called "vital wheat gluten" and contains about 75% protein, up to 8% moisture, and varying amounts of starch, lipids, and fiber. When hydrated, it forms a cohesive viscoelastic mass, unlike other plant proteins. Wheat gluten is an important item in world trade and is a significant ingredient in the food (e.g., bakery, pasta, noodle, breakfast cereal, and snack products), feed, and pet food industries.

Wheat gluten has an isoelectric point at pH 7.5, meaning it has equal number of positive and negative charges and minimum solubility at that pH. This also means that wheat gluten possesses good solubility at acidic and alkaline pHs depicting a U-shaped pH/solubility curve.

Commercial wheat starch has about 10% moisture and is typically bright white in color with free-flowing properties. The starch is composed of about 75% by weight of large, lenticular granules and about 25% by weight of small, round granules. The diameter of large granules can vary from 17.0-20.2 microns or 28.5-34.0 microns, depending on the particle size technique used. The small granules have diameters ranging from 3.9-4.2 microns and 8.2-10.0 microns. Wheat starch contains minor components consisting of lipids (about 1%), proteins (about 0.5%), ash, and dietary fiber. The proteins of wheat starch are located in the exterior of the granules (primarily residual gluten, histones, and purothionins) or in the interior of the granules (predominantly enzymes in nature). The proteins inside the granule are contributed mainly by granule-bound starch synthase plus other proteins, namely starch synthases and starch branching enzymes.

Sufficiently sensitive and reliable methods for gluten detection and quantitation may use Enzyme-Linked Immunosorbent Assay (ELISA) methodology, polymerase chain reaction (PCR), and/or liquid chromatography-mass spectrometry (LC-MS). Two ELISA methods are based on the monoclonal R5 antibody, which is directed toward the epitope glutamine-glutamine-proline-phenylalanine-proline (QQPFP) present in the proteins of wheat, barley, and rye. R5 ELISA is available as a sandwich ELISA (AACCI Method 38-50.01) for intact gluten proteins with at least two binding epitopes and as a competitive ELISA (AACCI Method 38-55.01) for partially hydrolyzed gluten that needs only one epitope for binding. A third ELISA method based on G12 antibody (AACCI Method 38-52.01) has also been developed. The G12 antibody specifically recognizes the fragment glutamine-proline-glutamine-leucine-proline-tyrosine (QPQLPY) within a 33-mer peptide. These ELISA methods allow for verifying that food products meet the standard of less than 20 ppm of gluten established for gluten-free food labeling.

Broadly characterized, this disclosure describes methods of quantitatively solubilizing gluten proteins from a starch and extracting the dissolved proteins to produce a gluten-free or relatively gluten-free starch that is independently confirmed that the gluten content satisfies the Codex and/or USFDA definition for "gluten-free." In particular, a starch slurry may be treated with one or more agents, such as acids, alkalis, alcohols, surfactants, proteases, chaotropic agents, reducing agents, and/or combinations of these agents or other agents to dissolve or otherwise degrade residual gluten proteins. The starch slurry may then be washed, and the dissolved proteins may be removed, such as by centrifugation or filtration. The purified starch slurry may then be dried, resulting in the purified starch. The "gluten-free" status of the purified starch may then be confirmed through testing for gluten level using an appropriate test, such as R5 sandwich ELISA, R5 competitive ELISA, or G12 Romer ELISA.

In one embodiment, a method of processing a starch from a plant belonging to the tribe Triticeae (e.g., wheat, rye, barley, triticale) and containing a gluten protein to produce a gluten-free (i.e., less than 20 ppm of gluten) starch may proceed substantially as follows. A slurry of the unpurified starch containing the starch and the gluten protein may be obtained. In certain embodiments, the starch slurry has a specific gravity of from about 18° to about 25° Baumé, from about 19° to about 23° Baumé, from about 20° to about 22° Baumé, or about 21° Baumé. In certain embodiments, the starch slurry comprises from about 30% to about 50% by weight, from about 33% to about 45% by weight, or from about 35% to about 42% by weight starch solids.

The slurry of the starch may be treated to dissolve or otherwise degrade the gluten protein. Treating the slurry of the starch may include adding an agent thereto. The agent can be an acid, a base, an alcohol, a surfactant, a protease, a chaotropic agent, a reducing agent, or combinations thereof. Exemplary acids that may be used with the present invention include mineral acids (e.g., hydrochloric acid, sulfuric acid, phosphoric acid, nitric acid, and boric acid), organic acids (e.g., formic acid, acetic acid, propionic acid, butyric acid, lactic acid, malic acid, citric acid, tartaric acid, and succinic acid), and salts thereof. In certain embodiments, the acid should be added to the starch slurry so as to lower the pH of the slurry to less than 5.0, less than 4.5, or less than 4. In other embodiments, the acid may be added to the starch slurry so as to provide a pH of from about 1 to about 5, from about 1.5 to about 4, or from about 2 to about 3.5.

Common alkaline chemicals that may be used with the present methods are hydroxides of ammonium, sodium, potassium, calcium, and magnesium, and alkaline salts (e.g., sodium carbonate and potassium carbonate). In embodiments in which the agent comprises a basic material, the agent may be added to the starch slurry in an amount so as to raise the pH of the starch slurry to at least 9, at least 10, or at least 11. In other embodiments, the basic agent may be added to the starch slurry so as to provide a pH of from about 9 to about 13, from about 9.5 to about 12.5, from about 10 to about 12, or from about 10.5 to about 11.5.

Exemplary alcohols that may be used with the present invention include $C_2$-$C_{10}$ alcohols, such as ethyl alcohol, propyl alcohol, and isopropyl alcohol. In certain embodiments, the alcohol may be added to the starch slurry so as to provide an alcohol level within the starch slurry of from about 40% to about 80% by weight, from about 45% to about 75% by weight, or from about 50% to about 70% by weight based upon the amount of starch solids contained in the slurry.

Exemplary surfactants that may be used with the present invention include anionic, cationic, nonionic, and zwitterionic surfactants. In certain embodiments, the surfactant is an anionic surfactant such as sodium lauryl sulfate (or sodium dodecyl sulfate). In embodiments in which a surfactant is added to the starch slurry, it is added so as to provide a surfactant level within the starch slurry of from about 0.01% to about 5% by weight, from about 0.1% to about 2.5% by weight, or from about 0.25% to about 1% by weight, based upon the amount of starch solids contained in the slurry.

Chaotropic agents are molecules in a water solution that can disrupt the hydrogen bonding network between water molecules. This has an effect on the stability of the native state of other molecules in solution, such as proteins, by weakening the hydrophobic effect. For example, a chaotropic agent reduces the amount of order in the structure of a protein formed by water molecules, both in the bulk and the hydration shells around hydrophobic amino acids, and may cause its denaturation. Exemplary chaotropic agents that may be used with the present invention include urea, guanidine hydrochloride, dicyandiamide, and thiourea, and combinations thereof. In embodiments in which a chaotropic agent is added to the starch slurry, it is added so as to provide a chaotropic agent level within the starch slurry of from about 0.01% to about 5% by weight, from about 0.1% to about 2.5% by weight, or from about 0.25% to about 1% by weight, based upon the amount of starch solids contained in the slurry.

Exemplary proteases that may be used with the present methods include endoproteases, exoproteases, or mixtures of endo/exoproteases. In particular embodiments, the protease may be alcalase or a proline specific protease such as MaxiPro PSP, from DSM Food Specialties. Proteases generally are capable of solubilizing wheat proteins by virtue of their ability to hydrolyze the proteins into low-molecular weight, water soluble peptides or oligopeptides and even down to amino acids. In embodiments in which proteases are added to the starch slurry, it is added so as to provide a protease level within the starch slurry of from about 0.001% to about 1% by weight, from about 0.005% to about 0.5% by weight, or from about 0.01% to about 0.1% by weight, based upon the amount of starch solids contained in the slurry.

Exemplary reducing agents that may be used with the present methods include sodium metabisulfite, beta-mercaptoethanol, L-cysteine, and glutathione. Reducing agents generally cleave disulfide bonds in proteins to aid in solubilization of gluten proteins. In embodiments in which reducing agents are added to the starch slurry, they are added so as to provide a reducing agent level within the starch slurry of from about 0.01% to about 3% by weight, from about 0.025% to about 1% by weight, or from about 0.05% to about 0.5% by weight, based upon the amount of starch solids contained in the slurry.

Treating the starch slurry may also include heating the starch slurry to a temperature that is greater than room or ambient temperature and less than the boiling point of the slurry. In certain embodiments, this involves heating the starch slurry to a temperature from about 80° F. to about 120° F., from about 85° F. to about 115° F., or from about 90° F. to about 110° F. The slurry may also be stirred or otherwise agitated during the treating step for a period of time of from about 10 minutes to about two hours, from about 30 minutes to about 1.5 hours, or about 1 hour.

The degraded gluten protein may be removed resulting in a slurry of the purified starch. Removing the degraded gluten proteins may include washing the slurry of the starch with water and centrifuging or filtering the washed slurry of the starch to separate the purified starch from the degraded gluten proteins. A pH of the slurry of the purified starch may be adjusted to approximately between 5.0 and 6.5 using food-grade acidic or alkali agents, including those mentioned above. The slurry of the purified starch may be dried resulting in the purified starch. Drying the slurry of purified starch may involve drying in a flash drier or in a spray drier. The purified starch may be tested to confirm that it contains less than 20 ppm of the gluten protein. Testing the purified starch may include using a test such as R5 sandwich ELISA, R5 competitive ELISA, or G12 Romer ELISA. Various exemplary implementations of this method are described as follows.

In a first implementation, a wheat starch slurry (approximately 15,000 gallons, 21 Baumé, 100° F.) may be transferred to a tank equipped with an agitator. An approximately 10% sodium hydroxide solution may be slowly added to the slurry to adjust the pH to approximately 11.0. The slurry may then be allowed to stir for approximately one hour to solubilize residual gluten proteins. The slurry may then be washed with fresh water and centrifuged to remove the solubilized proteins and residual sodium hydroxide. The purified starch slurry may then be adjusted to approximately pH 5.0-6.5 using an approximately 10% hydrochloric acid solution. The starch slurry may then be dried in a flash or spray drier, resulting in the purified starch. The purified starch may then be tested.

In a second implementation, a wheat starch slurry (approximately 15,000 gallons, 21 Baumé, 100° F.) may be transferred to a tank equipped with an agitator. An approximately 10% hydrochloric acid solution may be slowly added to the slurry to adjust the pH to approximately 3.5. The slurry may then be allowed to stir for approximately one hour to solubilize any residual gluten proteins. The purified starch slurry may then be washed with fresh water and centrifuged to remove the solubilized proteins and residual hydrochloric acid. The purified starch slurry may then be adjusted to approximately pH 5.0-6.5 using an approximately 10% sodium hydroxide solution. The starch slurry may then be dried in a flash or spray drier, resulting in the purified starch. The purified starch may then be tested.

In a third implementation, a wheat starch slurry (approximately 15,000 gallons, 21 Baumé, 100° F.) may be transferred to a tank equipped with an agitator. Alcalase (approximately 0.02% based on starch solids), which is a protease, may be slowly added to the slurry. The slurry may then be allowed to stir for approximately one hour at approximately pH 5-6 to hydrolyze any residual gluten proteins. The slurry may then be washed with fresh water and centrifuged to remove the solubilized/degraded proteins and residual alcalase. The purified starch slurry may then be adjusted to approximately pH 5.0-6.5, and then dried in a flash or spray drier, resulting in the purified starch. The purified starch may then be tested.

In a fourth implementation, a wheat starch slurry (approximately 15,000 gallons, 21 Baumé, 100° F.) may be transferred to a tank equipped with an agitator. MaxiPro PSP (approximately 0.02% based on starch solids), which is a proline-specific protease, may be slowly added to the slurry. The slurry may then be allowed to stir for approximately one hour at approximately pH 5-6 to hydrolyze any residual gluten proteins. The slurry may then be washed with fresh water and centrifuged to remove the solubilized/degraded proteins and residual MaxiPro PSP. The purified starch slurry may then be adjusted to approximately pH 5.0-6.5, and then dried in a flash or spray drier, resulting in the purified starch. The purified starch may then be tested.

In a fifth implementation, a wheat starch slurry (approximately 15,000 gallons, 21 Baumé, 100° F.) may be transferred to a tank equipped with an agitator. Sodium lauryl sulfate (approximately 0.5% based on starch solids), which is a surfactant, may be slowly added to the slurry. The slurry may then be allowed to stir for approximately one hour at approximately pH 5-7 to solubilize any residual gluten proteins. The slurry may then be washed with fresh water and centrifuged to remove the solubilized proteins and residual sodium lauryl sulfate. The purified starch slurry may then be adjusted to approximately pH 5.0-6.5, and then dried in a flash or spray drier, resulting in the purified starch. The purified starch may then be tested.

In a sixth implementation, a wheat starch slurry (approximately 15,000 gallons, 21 Baumé, 100° F.) may be transferred to a tank equipped with an agitator. Urea (approximately 0.5% based on starch solids), which is a chaotropic agent, may be slowly added to the slurry. The slurry may then be allowed to stir for approximately one hour at approximately pH 5-7 to solubilize any residual gluten proteins. The slurry may then be washed with fresh water and centrifuged to remove the solubilized proteins and residual urea. The purified starch slurry may then be adjusted to approximately pH 5.0-6.5, and then dried in a flash or spray drier, resulting in the purified starch. The purified starch may then be tested.

In a seventh implementation, a wheat starch slurry (approximately 15,000 gallons, 21 Baumé, 100° F.) may be transferred to a tank equipped with an agitator. Sodium metabisulfite (approximately 0.1% based on starch solids), which is a reducing agent, may be slowly added to the slurry. The slurry may then be allowed to stir for approximately one hour at approximately pH 5-7 to solubilize any residual gluten proteins. The slurry may then be washed with fresh water and centrifuged to remove the solubilized proteins and residual sodium metabisulfite. The purified starch slurry may then be adjusted to approximately pH 5.0-6.5, and then dried in a flash or spray drier, resulting in the purified starch. The purified starch may then be tested.

To verify some of the above described implementations, lab trials were conducted by the assignee of this application, Manildra Milling Corporation.

Various wheat starches, described as native (U.S. origin), organic (U.S. origin), and starch from Australian flour were used as exemplary starch sources. All starches were produced by Manildra at its various facilities. The starches from native and organic flours were produced in the United States, while the Australian was produced in that country. Due to differences in the raw wheat sources and the starch separation processes, the gluten protein content of the starch varied from one source to another. Each of these starches was combined with different chemicals or enzymes to assess the ability to achieve the less than 20 ppm of gluten required by the Codex and the FDA to be considered gluten-free. Australian and organic wheat starches have a lower ppm of gluten to use as a starting material, which is advantageous, but not always necessary, as will be shown below.

As discussed above, chemical or enzyme treatments, at various levels, were identified for use in treating starch. The following specific agents were tested:

| | |
|---|---|
| Protease enzymes | Alcalase |
| Acids | Sodium Hydroxide |
| Alkalis | Hydrochloric Acid |
| | Sodium metabisulfate |
| Surfactants | Sodium dodecyl sulfate |
| Chaotropic Agents | Urea |

Through a series of laboratory experiments these agents were employed at various levels to attempt to achieve the less than 20 ppm gluten protein standard. Outside testing was performed on the starch for gluten ppm by FARRP labs—University of Nebraska-Lincoln—Food Innovation Center, Lincoln, Nebr., using the R-Biopharm RIDASCREEN. All other testing, e.g., viscosity, pH, and ash, were performed in house at Manildra.

The lab trials were done in three steps:

Step 1 included lab scale trials with original dosages of the chemicals or enzymes. The success of these tests led to Step 2.

Step 2 included laboratory scale trials including various changes to agent levels and washing methods. These levels were increased or decreased based upon gluten protein ppm results from the first trial. In this phase, all trials were run with organic wheat starch as the initial starch containing wheat gluten protein.

Step 3 laboratory scale trials were performed with more changes to the chemicals and enzymes, and for five of the tests the base material was changed from organic wheat starch to Australian wheat starch, which has even lower initial gluten levels.

Below, each gluten reduction procedure is outlined for all three trials, starting with the testing of the starting materials to establish initial gluten protein levels.

Starting Material Analysis

All tests ran for the three trials were run with 1 of 3 starting materials, Organic Wheat Starch HORG 080315, Native Wheat Starch H100215, or Australian Wheat Starch N091815. As noted above, each of these is a wheat starch product prepared by and available from Manildra. Each starting material was tested for gluten ppm, viscosity, and residual enzyme activity where necessary. The results are as follows:

| Starch Description | Gluten ppm (FARRP Labs) | Viscosity B.U. |
|---|---|---|
| Organic HORG080315 | 470 ppm | 351 B.U. |
| Native H100215 | 600 ppm | 343 B.U. |
| Australian N091815 | 36 ppm | 329 B.U. |

Viscosity here is measured on a Brabender instrument and results are reported in Brabender units.

Initial gluten concentration and viscosity emerged as important guides to determine success in making the product gluten free without damaging the functionality of the starch. Maintaining starch functionality is vital to the final starch product.

The following data and explanations are divided out for each of the 7 different chemicals/enzymes that were employed, including any modification.

The Protease Method

The first trial with Alcalase (a protease) was performed using both the native wheat starch (60 grams) and organic wheat starch (60 grams) slurried with 90 grams of water, to be combined with 0.022% of Alcalase, and was allowed to react for two hours under stirring at 104° F. at 5.5-6.5 pH. This treated slurry was then washed three times with water and centrifuged, to mimic plant conditions, to rid the sample of enzyme and the destroyed gluten.

Below are the gluten results and chemical usage data:

| Initial Starch Product | FARRP Results- Gluten ppm | Chemical Usage | Enzyme Activity |
|---|---|---|---|
| HORG080315- organic starch | BLQ* Below the limit of quantization | 0.022% Alcalase | None |
| H100215-native starch | BLQ* Below the limit of quantization | 0.022% Alcalase | None |

It can be seen readily, that 0.022% Alcalase is sufficient to reduce gluten protein levels below the 20 ppm level in initial starches having gluten present at up to at least 600 ppm.

Trial 2 followed trial 1 with the following modifications:
1. Normal method (0.022% Alcalase) but with two times the starch, 120 grams.

2. Normal method with only two washings instead of three (to determine the ability of getting rid of the enzyme with less washing) with 120 grams of starch.
3. 50% reduction of Alcalase (0.011% Alcalase) with 120 grams of starch.
4. All methods were conducted on organic wheat starch (initial gluten protein 470 ppm).

The results were as follows:

| Initial Starch Product | FARRP Results-Gluten ppm | Chemical Usage | Viscosity | Enzyme Activity |
|---|---|---|---|---|
| HORG080315-120 g-of Organic starch | BLQ* Below the limit of quantization | 0.022% Alcalase | 415 B.U. | None |
| HORG080315-120 g-of Organic starch | BLQ* Below the limit of quantization | 0.022% Alcalase | 332 B.U. | None |
| HORG080315-120 g-of Organic starch | BLQ* Below the limit of quantization | 0.011% Alcalase | 370 B.U. | None |

Here, it is clear that even when increasing the amount of initial product and reducing the amount of protease, gluten protein content is successfully reduced below the 20 ppm standard.

Trial 3 employed further modifications:
1. Continue to use Organic Wheat Starch HORG080315.
2. Reduce the level of Alcalase in samples to 25% of original amount and 10% of original amount.
3. Continue using 120 grams of wheat starch.
4. Run previous successful tests in duplicates.

Data Obtained after Testing with Above Modifications:

| Initial Starch Product | FARRP Results-Gluten ppm | Chemical Usage | Viscosity |
|---|---|---|---|
| HORG080315-120 g-Organic Wheat Starch | 20 ppm | 0.0055% Alcalase | 392 B.U. |
| HORG080315-120 g-Organic Wheat Starch | 46 ppm | 0.0055% Alcalase | 372 B.U. |
| HORG080315-120 g-Organic Wheat Starch | 7 ppm | 0.0022% Alcalase | 243 B.U. |
| HORG080315-120 g-Organic Wheat Starch | 12 ppm | 0.0022% Alcalase | 274 B.U. |

The Protease treatment, particularly when using alcalase, works best when using 0.0022%-0.022% Alcalase, based on dried starch weight, and washed three times to ensure that the enzyme and protein is washed out of the starch, using a starch with an initial ppm of 470 or less. In some embodiments, alcalase may be introduced at about 0.001% to about 0.05% by weight, or about 0.002% to about 0.02% by weight.

Alkali Method (Sodium Hydroxide (NaOH))

The first trial with Sodium Hydroxide was performed, on both the native wheat starch (60 grams) and organic wheat starch (60 grams) slurried with 90 grams of water, to be combined with 15 grams of 0.5 M NaOH and allowed to react for 1 hour under stirring at 104° F., washed, then treated with 15 grams of 0.5 M NaOH again. Then, again, allowed to react for 1 hour under stirring at 104° F., before adjusting the pH to 5.5 using 0.5 M Hydrochloric Acid. This product was then washed three times, to mimic plant conditions, to rid the sample of the agent and the gluten. Below are the gluten results and chemical usage data:

| Initial Starch Product | FARRP Results-Gluten ppm | Chemical Usage |
|---|---|---|
| HORG080315-60 g-Organic Wheat Starch | 13 ppm | 33.7 g of 0.5M NaOH and 31.7 g 0.5M HCl |
| H100215-60 g Native Wheat Starch | 6 ppm | 33.7 g of 0.5M NaOH and 31.7 g of 0.5M HCl |

The results support that starch containing gluten at least as high as 600 ppm can be successfully treated with sodium hydroxide to achieve the desired gluten-free levels.

Trial 2 was performed with the following modifications:
1. Normal method but with 2 times the starch, 120 grams.
2. 50% reduction of Sodium Hydroxide with 120 grams of starch.
3. All samples will be run on organic wheat starch.

The results were as follows:

| Initial Starch Product | FARRP Results-Gluten ppm | Chemical Usage | Viscosity |
|---|---|---|---|
| HORG080315-120 g-Organic Wheat Starch | 13 ppm | 67.41 g of NaOH and 63.72 g of HCl | 389 B.U. |
| HORG080315-120 g-Organic Wheat Starch | 24 ppm | 33.7 g of NaOH and 32.02 g of HCl | 410 B.U. |

Trial 3 for Sodium Hydroxide treated starch were conducted with the following changes to procedure:
1. Continue to use Organic Wheat Starch HORG080315.
2. Reduce the level of Sodium Hydroxide to 75% and 50%.
3. Continue using 120 grams of wheat starch.
4. Run tests in duplicates.

The procedures otherwise remained the same as the original.

| Initial Starch Product | FARRP Results-Gluten ppm | Chemical Usage | Viscosity |
|---|---|---|---|
| HORG080315-120 g-Organic Wheat Starch | 8 ppm | 50.5 g of 0.5M NaOH 36.2 g of 0.5M HCl | 322 B.U. |
| HORG080315-120 g-Organic Wheat Starch | 5 ppm | 50.5 g of 0.5M NaOH 35.0 g of 0.5M HCl | 344 B.U. |
| HORG080315-120 g-Organic Wheat Starch | 44 ppm | 33.7 g of 0.5M NaOH 30.9 g of 0.5M HCl | 273 B.U. |
| HORG080315-120 g-Organic Wheat Starch | 41 ppm | 33.7 g of 0.5M NaOH 30.7 g of 0.5M HCl | 362 B.U. |

Summary Conclusion for Sodium Hydroxide Method:

The Sodium Hydroxide treatment works best when using 42.06%-56.18% NaOH and 42.06-52.9% HCl, based on dried starch weight, and washed three times to ensure that the chemical and gluten is washed out of the starch, using a starch with an initial ppm of 470 or less.

Acid Trials (HCl)

The first trial with Hydrochloric Acid was performed using both the native wheat starch (60 grams) and organic wheat starch (60 grams) slurried with 90 grams of water, to be combined with 0.5 M HCl, adjusting the pH until it reached 2.5. This solution was allowed to react for 1 hour under stirring at 104° F., washed, then dropped again to 2.5 pH. The solution reacted for another hour under stirring at 104° F., before adjusting the pH to 5.5 using 0.5 M NaOH. This product was then washed three times, to mimic plant conditions, in ridding the sample of agent and the destroyed protein. Below are the gluten results and chemical usage data:

| Initial Starch Product | FARRP Results-Gluten ppm | Chemical Usage |
|---|---|---|
| HORG080315-60 g-Organic Wheat Starch | 60 ppm | 10.9 g of 0.5M NaOH and 9.8 g of 0.5M HCl |
| H100215-60 g-Native Wheat Starch | 65 ppm | 10.6 g of 0.5M NaOH and 9.7 g of 0.5M HCl |

As can be seen, although this treatment effectively reduced gluten levels, it was unsuccessful in reducing gluten levels from as low as 470 ppm to below the 20 ppm threshold.

For acid Trial 2, the following changes:
1. Further the pH drop to 1.8-2.0 pH.
2. All samples will be run on organic wheat starch.
3. Double the amount of starch was used.

The results were as follows:

| Initial Starch Product | FARRP Results-Gluten ppm | Chemical Usage | Viscosity |
|---|---|---|---|
| HORG080315-Hydrochloric Acid-120 g-pH Drop 1.8-2.0 | 53 ppm | 39.4 g of NaOH and 41.0 g of HCl | 190 B.U. |

Again, although a significant reduction in gluten content is observed, the threshold 20 ppm was not reached.

Trial 3 for Hydrochloric Acid treated starch were performed with the following changes to procedure:
1. Use Australian wheat starch with lower initial gluten ppm (i.e., 38 Ppm).
2. Go back to original pH zone of lowering to 2.5.
3. Continue using 120 grams of wheat starch.

| Initial Starch Product | FARRP Results-Gluten ppm | Chemical Usage | Viscosity |
|---|---|---|---|
| N091815-120 g-Australian Starch | 10 ppm | 31.9 g of 0.5M NaOH 32.6 g of 0.5M HCl | 395 B.U. |

These results demonstrate that acid treatment is effective for reduction of gluten level to below the 20 ppm when initial gluten levels are closer to the threshold.

The Hydrochloric Acid treatment works best when the pH is dropped down to 2.5, then washed three times to ensure that the chemical and destroyed gluten is washed out of the starch, using a starch with a relatively low initial gluten content, such as 36 ppm or less.

Surfactant (Sodium Dodecyl Sulfate) Trials

The first trial with Sodium Dodecyl Sulfate was performed using native wheat starch (60 grams) and organic wheat starch (60 grams) slurried with 90 grams of water, to be combined with Sodium Dodecyl Sulfate at 5.5-6.5 pH. This solution was allowed to react for 1 hour under stirring at 104° F., then washed and re-slurried. More Sodium Dodecyl Sulfate was added to the solution, which then reacted for another hour under stirring at 104° F. This product was then washed three times, to mimic plant conditions, in ridding the sample of enzyme and the destroyed protein. Below are the gluten results and chemical usage data:

| Initial Starch Product | FARRP Results-Gluten ppm | Chemical Usage |
|---|---|---|
| HORG080315-OrganicWheat Starch | 56 ppm | 0.7 g of Sodium Dodecyl Sulfate |
| H100215-Native Wheat Starch | 56 ppm | 0.7 g of Sodium Dodecyl Sulfate |

Gluten levels were significantly reduced, but not below the threshold 20 ppm level.

The second trial employed the following changes:
1. Add 50% more SDS.
2. All samples will be run on organic wheat starch
3. Double the amount of starch was used.

The results were as follows:

| Initial Starch Product | FARRP Results-Gluten ppm | Chemical Usage | Viscosity |
|---|---|---|---|
| HORG080315-120 g-Organic Wheat Starch | 23 ppm | 2.24 g of SDS 50% increase of SDS | 380 B.U. |

Again, significant gluten protein reduction was seen, but not below the threshold level.

Trial 3 for Sodium Dodecyl Sulfate treated starch employed further changes:
1. Use Australian wheat starch-lower initial gluten ppm.
2. Go back to original amount of SDS.
3. Continue using 120 grams of wheat starch.
4. The procedures all remained the same as the originals with the above changes.

| Initial Starch Product | FARRP Results-Gluten ppm | Chemical Usage | Viscosity |
|---|---|---|---|
| N091815 Australian Starch-SDS Treatment | 6 ppm | 1.5 g of SDS | 456 B.U. |

The desired threshold levels were reached when starting with a lower initial gluten content.

The Sodium Dodecyl Sulfate treatment works best when using 1.246% SDS or more, then washing three times to ensure that the chemical and protein is washed out of the starch, using a starch with a lower initial gluten content, such as 36 ppm or less.

Sodium Metabisulfite Trials

The first trial with Sodium Metabisulfite was performed using both the native wheat starch (60 grams) and organic wheat starch (60 grams) slurried with 90 grams of water, to be combined with Sodium Metabisulfite 5.5-6.5 pH. This solution was allowed to react for 1 hour under stirring at 104° F., then washed and re-slurried. The solution was treated with more Sodium Metabisulfite, reacted for another hour under stirring at 104° F. This product was then washed three times, to mimic plant conditions, in ridding the sample of enzyme and the destroyed protein. Below are the gluten results and chemical usage data:

| Initial Starch Product | FARRP Results-Gluten ppm | Chemical Usage |
|---|---|---|
| HORG080315-Sodium Metabisulfite | 71 ppm | 0.41 g of Sodium Metabisulfite |
| H100215-Sodium Metabisulfite | 47 ppm | 0.41 g of Sodium Metabisulfite |

The threshold 20 ppm gluten protein was not reached. Trial 2 was performed with the following changes:
1. Add 50% more Sodium Metabisulfite.
2. All samples will be run on organic wheat starch.
3. Double the amount of starch was used.

| Initial Starch Product | FARRP Results-Gluten ppm | Chemical Usage | Viscosity |
|---|---|---|---|
| N091815 Australian Starch-Sodium Metabisulfite Treatment | 52 ppm | 0.82 g of Sodium Metabisulfite | 202 B.U. |

The results were as follows:

| Initial Starch Product | FARRP Results-Gluten ppm | Chemical Usage | Viscosity |
|---|---|---|---|
| HORG080315-Organic Wheat Starch-120 g | 51 ppm | 1.2 g of Sodium Metabisulfite | 151 B.U. |

Trial 3 for Sodium Metabisulfite treated starch employed the following changes to procedure:
1. Use Australian wheat starch-lower initial gluten ppm.
2. Go back to original amount of Sodium Metabisulfite.
3. Continue using 120 grams of wheat starch.

Oddly, this trial seemed to increase gluten content. It is believed to be an anomaly, and should be repeated.

Use of Sodium Metabisulfite as the agent was never successful in bringing the gluten ppm down to 20 or less.

Urea Trials

The first trial with Urea was performed using both the native wheat starch (60 grams) and organic wheat starch (60 grams) slurried with 90 grams of water, to be combined with Urea at 5.5-6.5 pH. This solution was allowed to react for 1 hour under stirring at 104° F., then washed and re-slurried. More urea was added and this solution reacted for another hour under stirring at 104° F. This product was then washed three times, to mimic plant conditions, in ridding the sample of enzyme and the destroyed protein. Below are the gluten results and chemical usage data:

| Initial Starch Product | FARRP Results-Gluten ppm | Chemical Usage |
|---|---|---|
| HORG080315-Urea | 56 ppm | 0.7 g of Urea |
| H100215-Urea | 62 ppm | 0.7 g of Urea |

Trial 2 was performed to implement the following changes to the Urea method:
1. Add 50% more Urea.
2. All samples will be run on organic wheat starch.
3. Double the amount of starch was used.

The results were as follows:

| Product | FARRP Results-Gluten ppm | Chemical Usage | Viscosity |
|---|---|---|---|
| HORG080315-Urea-120 g-50% more Urea | 23 ppm | 2.2 g of Urea | 380 B.U. |

Gluten content was significantly reduced, but not to below the threshold level.

Trial 3 for Urea treated starch explored further changes:
1. Use Australian wheat starch-lower initial gluten ppm.
2. Go back to original amount of Urea.
3. Continue using 120 grams of wheat starch.

The procedures all remained the same as the originals with the above changes.

| Product | FARRP Results-Gluten ppm | Chemical Usage | Viscosity |
|---|---|---|---|
| N091815 Australian Starch | 22 ppm | 1.5 g of Urea | 456 B.U. |

The Urea treatment was never successful in bringing the gluten ppm down to 20 or less.

Through the above-described lab trials, it was determined that the following methods, with the following initial gluten ppm and chemical ranges were able to achieve gluten-free standards:

Alcalase enzyme was successful using any starting material with 470 ppm of gluten or less, along with the Alcalase enzyme at 0.0022% (of starting dry weight) or more and washed three times.

Sodium Hydroxide method was successful using 42.06%-56.18% NaOH and 42.06-52.9% HCl, based on dried starch weight, and washed three times to ensure that the chemical and gluten is washed out of the starch, using a starch with an initial ppm of 470 or less.

The Hydrochloric Acid treatment was successful when the pH is dropped down to 2.5, then washed three times to ensure that the chemical and destroyed gluten is washed out of the starch, using a starch with an initial ppm of 36 or less.

The Sodium Dodecyl Sulfate treatment is successful when using 1.246% SDS or more, then washing three times to ensure that the chemical and destroyed protein is washed out of the starch, using a starch with an initial ppm of 36 or less.

In all of these trials, the viscosity of the product was within range of desired specifications and customer expectations in today's commercial applications.

Treatments using MaxiPro PSP, Urea, and Sodium Metabisulfite were unable to reduce the gluten content to desired levels. Further testing is required to establish whether these agents could be useful under different reaction conditions. The unsuccessful nature of the tests employing these agents demonstrates that finding an appropriate agent, and reaction conditions are unpredictable.

On the strength of the lab trials described above, full plant sized trials were performed as described below.

A plant trial was initiated and performed using the Alcalase method with the original amount of Alcalase, 0.022% per dry starch weight. The following procedure and flow chart outline of FIG. 1 illustrate the plant trial parameters.

Alcalase Method Procedure:
1. Slurry in a tank, 22,000 pounds of 10 percent moisture starch with (19,800 dry starch weight) with 1585 gallons of 110° F. water.
2. Maintain a temperature in the slurry at 104° F.

3. Add 4.36 pounds of Alcalase enzyme to the top of the tank slowly.
4. Allow batch to reticulate and stir for two hours.
5. At the end of two hours set the system up to wash through the Merco and 2 decanters adding fresh water to rinse out the residual enzyme and degraded gluten.
6. Adjust the pH after the second wash step and before the third wash step using sulfuric acid to 5.5 pH.
7. Dry the product, discard the first tote as changeover.
8. Sample 4 totes of the 8 totes produced: Totes Sampled: 1, 2, 4, and 7.
9. Send samples out for Gluten ppm testing to FARRP labs.
10. Test starch for residual enzyme activity.

| Tote Identification | R-Biopharm RIDASCREEN-FARRP | R-BIOPHARM competitive FARRP | Enzyme activity |
|---|---|---|---|
| Tote 1 | BLQ | BLQ | Yes |
| Tote 2 | 5 ppm | 11 ppm | No |
| Tote 4 | BLQ | 11 ppm | Yes |
| Tote 7 | BLQ | BLQ | Yes |

The above shows that the desired gluten content below 20 ppm is possible in starch. Future research will focus on better washing techniques to remove additional, unwanted enzymes.

In light of the success of the lab trials described above, plant scale testing was conducted.

Plant Trial—Gluten Free Starch Using Alcalase

A plant trial for the production of gluten free starch using 10,000 pounds of organic starch HORG040716, combined with the Alcase Enzyme (1.48 pounds or 0.0165%), was set up to prove that the conditions and results at the plant level will match the results obtained from the laboratory trials.

The plant trial consisted of 2 parts, the first part was done using the starch slurry and 0.0165% Alcalase enzyme to destroy the gluten. After this was done, it was washed three times to remove the hydrolyzed protein and remaining enzyme. The second part of the plant trial used the remainder of the slurry (about 5000 pounds of dry solids), and treated with Sodium Hydroxide in an attempt to deactivate the enzyme before washing. It was anticipated that by using the sodium hydroxide, it would be possible to wash off all the gluten fragments, and deactivate the enzyme.

The process in summary was conducted in the following steps:

Part I—4000 Pounds—GFS-A
1. Slurry the 10,000 of starch (9,000 dry weight) in the slurry tank with water at 104° F., until the specific gravity is 20-21 Baumé (approximately 40% solids).
2. Add 1.48 pounds of Alcalase enzyme to the slurry slowly.
3. Allow the slurry and enzyme to mix for two hours. At the end of the two hours, the slurry wash then washed three times (once on a Merco washer and 2 washes on decanters), before sending it to the dryer to be dried. NOTE: pH was adjusted after second wash to 5.5 using Sulfuric Acid.
4. After these steps, Sodium Hydroxide was added as described in part two.

Part II—4000 Pounds-GFS-ACS
1. Adjust the pH of the remaining slurry to 11, using Sodium Hydroxide (this is in an attempt to deactivate the Alcalase Enzyme and wash it out in the washing process).
2. After the pH has been adjusted, wash the slurry three times (once on a Merco washer and 2 washes on decanters), before drying it on a flash dryer. NOTE: pH was adjusted after second wash to 5.5 using Sulfuric Acid.

Results and Summary of the Plant Trial:

The plant trial results were in direct comparison with laboratory results that we had obtained previously. When the Alcalase enzyme was introduced to the starch slurry, allowed to react for two hours, and then triple washed before drying, we were able to make a product that tested gluten free (below 20 ppm) and that was free of any residual enzyme after the third wash. Part 2 of the trial, using Sodium Hydroxide to deactivate the enzyme, still produced a gluten free starch with no enzyme activity.

The process was successful in at least three key areas that matched up with laboratory results:
1. Both steps did not affect the functionality of the starch.
2. Both procedures gave a finished product that was free of the Alcalase enzyme.
3. Both procedures gave a finished product that qualified as Gluten Free (less than 20 ppm) using (through FARRP Labs outside laboratory):
   a. Test: R-Biopharm: BLQ=below 5 ppm
   b. Test: R-Biopharm Competitive Gliadin: BLQ=below 10 ppm

| Sample ID | Gluten ppm FARRP | Moisture | Viscosity | Ash | pH | Enzyme Activity |
|---|---|---|---|---|---|---|
| Part 1 GFS-A | BLQ* | 10.61 | 282 B.U. | .19 | 6.78 | None |
| Part 2-GFS ACS | BLQ | 10.89 | 309 B.U. | .21 | 7.02 | None |

*BLQ: Below the limit of quantization. The lower limit of quantization for the R-Biopharm RIDASCREEN Gliadin competitive assay (SOP-BGP-421) is 10 parts per million (ppm) gluten. Amounts below this level cannot be reliably tested in this assay. The R-Biopharm RIDASCREEN Gliadin competitive assay is equally cross-reactive with gliadin/gluten for wheat, rye, and barley. One ppm is equal to one milligram per kilogram of sample product.

If gluten had been detected in this sample at the lower limit of quantization of 10 ppm gluten, the FARRP laboratory estimated measurement of uncertainty for the R-Biopharm RIDASCREEN gliadin competitive assay would have been 5 ppm. This uncertainty represents an expanded uncertainty expressed at 95% confidence level (using a coverage factor of k=2).

The above methods are applicable to any starch that potentially is contaminated with wheat gluten. As noted above, the non-wheat starches such as corn starch, oat starch, rice starch, tapioca starch, mung bean starch, potato starch, or high amylose starch are amenable to the processes described herein. These starches, when treated similarly to the above-described methods, result in substantially gluten-free starches without introducing functional defects, allowing the starches to be used in products labeled as gluten-free, and where allowed, certified as gluten free. The table below shows some starting properties of non-wheat starches.

| Starch Type | Moisture | pH | Viscosity | Ash | Gluten ppm |
|---|---|---|---|---|---|
| Corn Starch | 10.22 | 6.39 | 620 | 0.31 | BLQ |
| Waxy Starch | 9.56 | 6.11 | 1506 | 0.28 | BLQ |
| Potato Starch | 9.14 | 6.05 | 3168 | 0.25 | BLQ |
| Tapioca Starch | 9.01 | 5.98 | 1489 | 0.23 | BLQ |

Although these starches show gluten free levels, it is known from experience, that from time to time, non-wheat starches are contaminated with cross-over wheat gluten due to being processed in the same plants or farms. Thus, although these starches are naturally gluten free as shown above, to avoid any uncertainty, these starches could regularly be treated similarly in accordance with the methods described herein. In some instances, because of the relatively low gluten contaminant concentration, methods described herein that might not achieve the less than 20 ppm gluten standard could be useful in removing the relatively low contaminant levels.

Although the invention has been described with reference to the one or more embodiments illustrated in the FIGURES, it is understood that equivalents may be employed and substitutions made herein without departing from the scope of the invention as recited in the claims.

I claim:

1. A method of producing a purified starch having less than 20 parts per million of the gluten protein, the method comprising the steps of:
    obtaining a slurry of an initial starch containing a gluten protein at about 600 ppm or less;
    treating the slurry of the starch with an endo-protease at a pH of 5.5 to 6.5 and agitating the slurry of the starch for about two hours to dissolve or degrade the gluten protein;
    washing the resultant slurry;
    removing the dissolved or degraded gluten protein, resulting in a slurry of the purified starch;
    adjusting pH of slurry of the purified starch to 5.0 to 6.5;
    washing the pH adjusted slurry of purified starch; and
    drying the washed pH adjusted slurry of the purified starch, resulting in the purified starch having less than 20 ppm of the gluten protein.

2. The method as set forth in claim 1, wherein the initial starch is derived from a source naturally containing gluten or from a source contaminated with gluten protein.

3. The method as set forth in claim 1, wherein the initial starch is selected from the group consisting of wheat starch, rye starch, barley starch, and triticale starch.

4. The method as set forth in claim 1, wherein the initial starch has about 470 ppm gluten protein or less.

5. The method as set forth in claim 1, wherein the initial starch has about 36 ppm gluten protein or less.

6. The method as set forth in claim 1, wherein the step of removing the dissolved or degraded gluten proteins includes centrifuging the washed slurry.

7. The method as set forth in claim 1, wherein the step of removing the dissolved or degraded gluten proteins includes filtering the washed slurry.

8. The method as set forth in claim 1, wherein the step of drying includes drying the slurry of the purified starch in a flash drier.

9. The method as set forth in claim 1, wherein the step of drying includes drying the slurry of the purified starch in a spray drier.

10. The method as set forth in claim 1, wherein the step of drying includes drying the slurry of the purified starch in a rotating drum drier.

11. The method as set forth in claim 1, further including the step of testing the purified starch to confirm that the purified starch contains less than 20 parts per million of the gluten protein.

12. The method as set forth in claim 11, wherein the step of testing the purified starch includes using a test selected from the group consisting of R5 sandwich ELISA, R5 competitive ELISA, and G12 Romer ELISA.

13. The method as set forth in claim 1, wherein the slurry of the starch has a specific gravity of from 18° to 25° Baumé.

14. The method as set forth in claim 1, wherein the treating step occurs at a temperature of from 80° F. to 120° F.

15. The method as set forth in claim 1, wherein the endo-protease is not a proline-specific protease.

* * * * *